United States Patent [19]

Miller

[11] 3,937,129

[45] Feb. 10, 1976

[54] LOAD RESPONSIVE SYSTEM WITH AREA CHANGE FLOW EXTENDER

[75] Inventor: Wendell E. Miller, Warsaw, Ind.

[73] Assignee: The Scott & Fetzer Company, Cleveland, Ohio

[22] Filed: Oct. 23, 1974

[21] Appl. No.: 517,244

[52] U.S. Cl. ...................... 91/412; 60/462; 91/414; 137/117; 137/596.13

[51] Int. Cl.$^2$ ........................................ F16B 13/08

[58] Field of Search ........ 60/462; 91/412, 414, 446; 137/117, 596.12, 596.13

[56] References Cited

UNITED STATES PATENTS

| | | | |
|---|---|---|---|
| 3,592,216 | 7/1971 | McMillen | 91/414 UX |
| 3,722,543 | 3/1973 | Tennis | 137/596.12 |
| 3,878,864 | 4/1975 | Schurger | 137/596.13 |

*Primary Examiner*—Alan Cohan
*Assistant Examiner*—Gerald A. Michalsky
*Attorney, Agent, or Firm*—McNenny, Farrington, Pearne & Gordon

[57] ABSTRACT

A load-responsive hydraulic system is provided in which the effective output of a fixed displacement pump is controlled by a bypass valve having three fluid-responsive areas.

The first fluid-responsive area is pressurized by pump pressure; and the directional control valve of the system includes a first fluid flow path which pressurizes the second fluid-responsive area with the load-actuating pressure of a fluid motor when the fluid motor is receiving pressurized fluid from the pump. Thus, the bypass valve is load responsive.

The directional control valve also includes a second fluid flow path which controls a fluid pressure which is applied to the third area; so that, the force balance of the bypass valve is changed by the force developed by the third area; and the difference between pump pressure and load-actuating pressure, while operating the system, is greater than the difference between pump pressure and sump pressure at standby.

43 Claims, 5 Drawing Figures

LOAD RESPONSIVE SYSTEM WITH AREA CHANGE FLOW EXTENDER

BACKGROUND OF THE INVENTION:

The present invention pertains to load-responsive hydraulic systems in which the effective output of the system is controlled by a difference between the load-actuating pressure and the pressure of the pump. This pressure differential is sensed across the directional control valve as fluid is directed from an inlet port to a work port. Thus the system pressure is maintained at a predetermined value above the load-actuating pressure of the fluid motor; and fluid flow to the motor is proportional to the flow opening through the throttling orifice of the control valve.

In load-responsive systems, it has been common to take pressurized fluid from either the control valve or the fluid motor, at the load-actuating pressure of the fluid motor, and to use this fluid to control the effective output of the pump. If the pump is of the fixed displacement type, the control of the effective output has traditionally been accomplished by the use of a bypass valve controlling the flow of excess fluid from the pump output to a sump; and, if the pump has been of the variable displacement or variable discharge type, a displacement or discharge control has been used to control the output of the pump.

There has been one particular problem with load-responsive systems when used with a fixed displacement pump. It is desirable to maintain a low pump pressure at standby to minimize horsepower loss and heat rise; and yet the low standby pressure has meant a low differential pressure; and a low differential pressure has severely limited the maximum flow that the control valve can supply to a fluid motor.

McMillen, in U.S. Pat. No. 3,631,890 proposed the use of a spring and piston to increase the differential pressure at which the system operates and thereby to increase the ability of a given size of control valve to deliver flow to a fluid motor. This particular device has the inherent limitation of poor response because of the time required to compress the spring. A similar device has been disclosed by Tolbert in U.S. Pat. No. 3,777,773.

The present invention provides a solution for this problem through the use of a bypass valve having three fluid-responsive areas and a directional control valve having special circuitry.

SUMMARY OF THE INVENTION:

The present invention provides an improved bypass valve for use with load-responsive hydraulic systems and an improved directional control valve for use with the bypass valve. The bypass valve cooperates with the directional control valve to bypass the entire output of a fixed displacement pump to a sump at a low standby pressure when the directional control valve is in its standby position; and the bypass valve and the directional control valve cooperate to bypass excess fluid from the fixed displacement pump to a sump when the directional control valve is in an operating position and pressurized fluid is being supplied from the pump to a fluid motor through the control valve.

The bypass valve includes first, second, and third fluid-responsive areas. The first fluid-responsive area is permanently connected to the pump to receive pressurized fluid therefrom and to develop a force urging the bypass valve toward a bypassing mode. The second fluid-responsive area is communicated with the fluid motor and the load-actuating pressure therein when the fluid motor receives pressurized fluid from the pump; and this load-actuating pressure on the second fluid-responsive area develops a force which opposes the force which is developed by the pump pressure on the first fluid-responsive area.

The third fluid-responsive area is adapted to receive the pump pressure and either the load-actuating pressure or the sump pressure, to assist or to oppose the force which is developed by the fluid pressure that is applied to the first fluid-responsive area, and to be pressurized by the pump pressure when the directional control valve is in an operating position or in the standby position, depending upon the particular embodiment.

The directional control valve includes a second area signal means which includes a first fluid flow path that applies the load-actuating pressure of the fluid motor to the second fluid-responsive area when the control valve is moved to an operating position and which includes means of reducing, or attenuating, the fluid pressure applied to this second fluid-responsive area when the control valve is in a standby position.

The directional control valve also includes third area signal means which establishes a second fluid flow path in the control valve and which is effective to apply pump output pressure to the third fluid-responsive area when the directional control valve is in one of its positions, operating or standby, and to apply a different pressure to this third fluid-responsive area when the directional control valve is in the other of its positions. This different pressure may be either the load-actuating pressure or the sump pressure, depending upon the particular embodiment of the invention.

The result is that the bypass valve and the directional control valve of the present invention cooperate to provide a differential operating pressure between the pump pressure and the load-actuating pressure which is greater than the difference in the pressure between the pump and the sump when the directional control valve is in a standby position.

For example, the present invention might be used to raise a standby pressure of 50 psi to a differential operating pressure of 150 psi, thereby increasing and almost doubling the flow capacity of the control valve.

A first objective is to provide a load-responsive hydraulic system having a fixed displacement pump in which the differential pressure across the throttling orifice of the control valve is greater than the standby pressure of the system.

A second objective is to provide a differential pressure actuated bypass valve for a load-responsive hydraulic system in which the bypass valve includes a third fluid-responsive area which is effective to change the effective area of either the first or the second fluid-responsive area.

A third objective is to provide a load-responsive hydraulic system utilizing a fixed displacement pump, a differential pressure actuated bypass valve having three fluid-responsive areas, and a directional control valve which controls two fluid flow paths and which controls the fluid pressure applied to the second and third fluid-responsive areas.

The above-mentioned and other features and objects of this invention and the manner of obtaining them will become more apparent and the invention itself will be best understood by reference to the following description of an embodiment of the invention taken in conjunction with the accompanying drawings.

Figure 1:
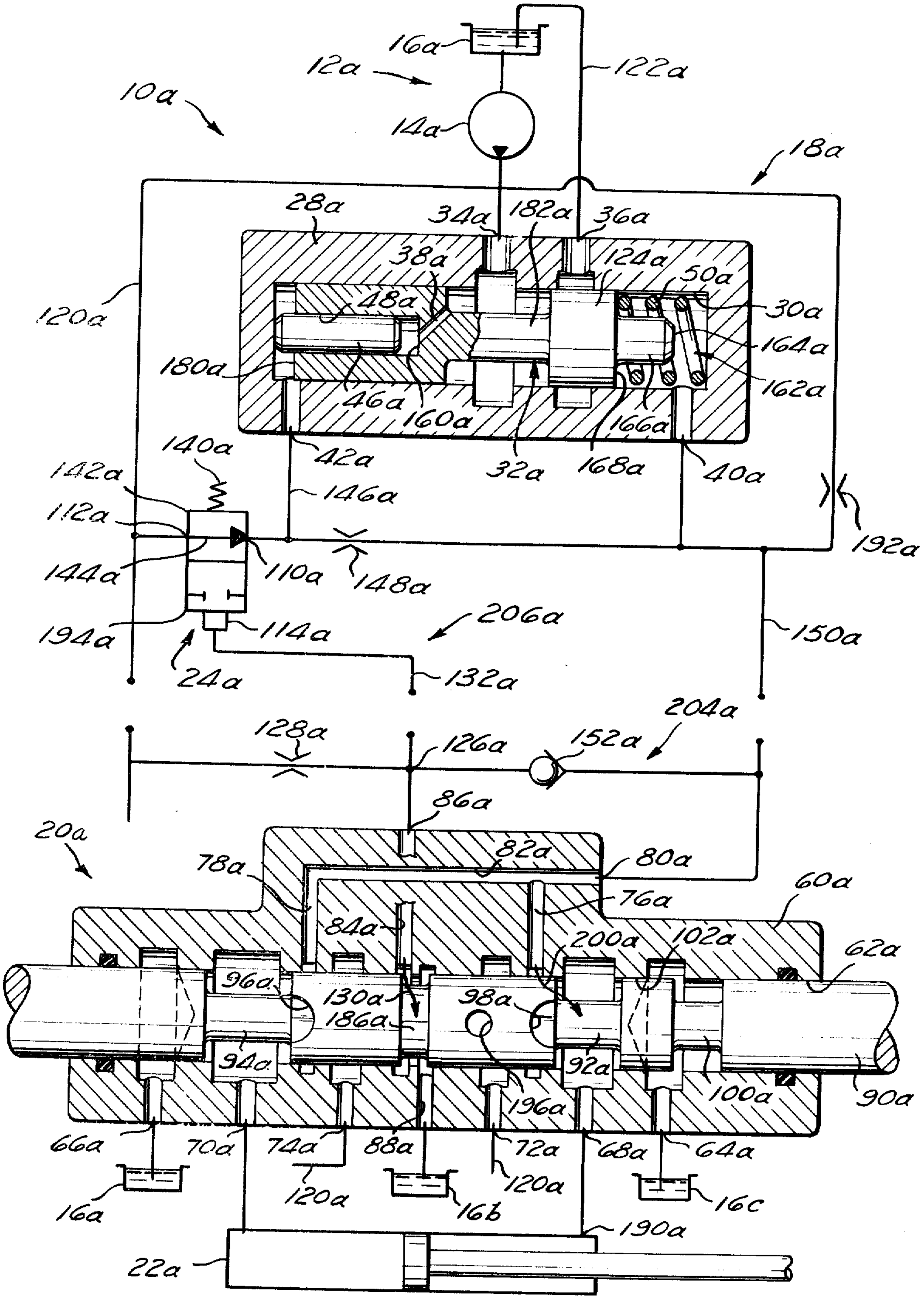
FIG. 1 is a schematic drawing of a first embodiment of the invention, showing both the differential pressure actuated bypass valve thereof and the directional control valve thereof in cross-section.

DESCRIPTION OF THE PREFERRED EMBODIMENTS:

Description of the FIG. 1 Embodiment:

Referring now to the drawings, and particularly to FIG. 1, the first embodiment of the invention comprises a load-responsive hydraulic system, generally depicted at 10*a*. The system 10*a* includes a source of fluid 12*a* that comprises a pump 14*a* and a sump 16*a*, a differential pressure actuated bypass valve 18*a*, a directional control valve 20*a*, a fluid-actuated device or fluid motor 22*a*, and a third area signal valve 24*a*.

The differential pressure actuated bypass valve 18*a* includes a housing 28*a*, a spool bore 30*a* in the housing 28*a*, a valve spool 32*a* being slidably fitted into the spool bore 30*a*, an input port 34*a*, a bypass port 36*a*, a first area port 38*a* which comprises a hole in the valve spool 32*a*, a second area port 40*a*, a third area port 42*a*, a plunger 46*a* being slidably fitted into a plunger bore 48*a* of the valve spool 32*a*, and a spring 50*a*.

The directional control valve 20*a* includes a body 60*a* having an element bore 62*a* therein, a pair of return ports 64*a* and 66*a* intercepting the element bore 62*a*, a pair of work ports 68*a* and 70*a* intercepting the element bore 62*a*, and a pair of inlet ports 72*a* and 74*a* intercepting the element bore 62*a*.

The directional control valve 20*a* also includes a pair of load signal passages 76*a* and 78*a* intercepting the element bore 62*a* and being connected to a first signal port 80*a* by a longitudinal passage 82*a*, an attenuation signal passage 84*a* intercepting the element bore 62*a* and having a portion thereof which comprises a second signal port 86*a*, and an attenuation return passage 88*a*.

The directional control valve 20*a* further includes a movable valving element 90*a* being slidably fitted into the element bore 62*a*. Movable valving elements, such as element 90*a*, are customarily spring-loaded to a neutral or standby position as shown in FIG. 1 wherein the work ports 68*a* and 70*a* are isolated from both the inlet ports 72*a* and 74*a* and the return ports 64*a* and 66*a*.

The movable valving element 90*a* is movable to the right, as viewed in FIG. 1, to a first operating position wherein the work port 68*a* is communicated to the return port 64*a* by way of a reduced diameter portion 92*a* of the valving element 90*a* and the work port 70*a* is communicated to the inlet port 74*a* by way of a reduced diameter portion 94*a* and a flat 96*a* of the valving element 90*a*.

In like manner, the valving element 90*a* is moved to the left to a second operating position wherein the work port 68*a* is communicated to the inlet port 72*a* by the reduced diameter portion 92*a* and a flat 98*a* and the work port 70*a* is communicated to the return port 66*a* by the reduced diameter portion 94*a*.

The valving element 90*a* is movable farther to the left, as viewed in FIG. 1, to a float position wherein the work port 68*a* is communicated to the return port 64*a* by a reduced diameter portion 100*a* of the valving element 90*a* that is then positioned to provide a flow path around a spool land 102*a* of the element bore 62*a*; and the work port 70*a* is communicated to the return port 66*a* by the reduced diameter portion 94*a*.

Since this operation of the directional control valve 20*a* is typical to the art, this standarized operation of the directional control valves 20*b* – 20*e* of FIGS. 2 – 5 will not be described in conjunction with the description of these other embodiments.

Referring again to FIG. 1, the third area signal valve 24*a* includes a first valved port 110*a*, a second valved port 112*a*, and a signal valve operator 114*a*. The functioning of the third area signal valve 24*a* will be described in the following paragraphs.

Referring again to FIG. 1, the functioning of system 10*a*, with the valving element 90*a* in the standby position as shown, is as follows: Fluid is received into the pump 14*a* from the sump 16*a* and is pressurized and delivered to a pump pressure conduit 120*a*. The pump pressure conduit 120*a* is connected to the inlet ports 72*a* and 74*a* which are isolated from the work ports 68*a* and 70*a* respectively, as previously noted. The pump pressure conduit 120*a* is also connected to the input port 34*a* of the bypass valve 18*a* and the input port 34*a* is isolated from a return conduit 122*a* and the sump 16*a* by a spool land 124*a* of the valve spool 32*a*. Fluid from the pump 14*a* and from the pump pressure conduit 120*a* is delivered to a point 126*a* by an operator supply restrictor-valve 128*a*; but the pressurization of the fluid at point 126*a* is prevented by a fluid flow path 130*a* to a sump 16*b*. The fluid flow path 130*a*, which will hereafter be referred to as the second fluid flow path, includes the second signal port 86*a*, the attenuation signal passage 84*a*, and the attenuation return passage 88*a*. The point 126*a* is connected to the signal valve operator 114*a* by a conduit 132*a*. Thus, no fluid pressure is applied to the operator 114*a* when the valving element 90*a* is in the standby position, as shown.

The third area signal valve 24*a* includes a spring 140*a* which is effective to move the signal valve 24*a* into a first position 142*a*, as shown, wherein a flow path 144*a* is effective to connect the pump pressure conduit 120*a* with a third area conduit 146*a*, the third area conduit 146*a* being connected to the third area port 42*a* and to a pressure change restrictor-valve 148*a*. The pressure change restrictor-valve 148*a* is connected to a second area conduit 150*a*.

The second area conduit 150*a* is connected to the point 126*a* by a one-way flow valve 152*a* and is connected to the second area port 40*a*. The one-way valve 152*a* is connected to the sump 16*b* through the second fluid flow path 130*a* that includes the attenuation signal passage 84*a*.

Thus the flow path 144*a* in the third area signal valve 24*a* provides pump pressure into the third area conduit 146*a;* and the pressure change restrictor-valve 148*a* and the one-way flow valve 152*a* cooperate with the second fluid flow path 130*a* to prevent a buildup of fluid pressure in the second area conduit 150*a*.

So it can be seen that, in the standby positon, the pressure of the pump pressure conduit 120*a* exists in the third area conduit 146*a;* and the pressure of the sump 16*b* exists in the second area conduit 150*a*, the conduit 132*a*, and the signal valve operator 114*a*.

With respect to the bypass valve 18*a*, the operation is as follows: When the valving element 90*a* of the directional control valve 20*a* is in the standby position, pump pressure from the pump pressure conduit 120*a* and the input port 34*a* is applied to a first fluid-responsive area 160*a* by means of the first area port 38*a*, the first fluid-responsive area 160*a* being provided by the bottom of the plunger bore 48*a*. The pressure of the sump 16*b* is applied to a second fluid-responsive area 162*a* by way of the second area conduit 150*a* and the second area port 40*a*, the second fluid-responsive area 162*a* comprising the sum total of the projected-end area 164*a* of the stop portion 166*a* and the annular projected-end area 168*a* of that portion of the valve spool 32*a* which lies radially outward from the outside diameter of the stop portion 166*a* to the outside diameter of the spool land 124*a*. The pump pressure is also applied to a third fluid-responsive area 180*a* which is provided by that portion of the valve spool 32*a* which lies radially outward from the plunger 46*a*.

Thus it can be seen that the pressure of the pump 14*a* is applied to the first fluid-responsive area 160*a* and to the third fluid-responsive area 180*a* of the valve spool 32*a*, and that the sum of these two areas is equal to the full projected-end diameter of the valve spool 32*a*. This pump pressure, being applied to areas 160*a* and 180*a*, is opposed only by the spring 50*a* since the second fluid-responsive area 162*a* is communicated to the sump 16*b* by way of the one-way flow valve 152*a* and the second fluid flow path 130*a*. The result is that, at a very low pump pressure, the pump 14*a* is able to move the valve spool 32*a*, from an operating mode as shown, to a standby mode in which the spool land 124*a* of the valve spool 32*a* is moved to the right, as viewed in FIG. 1 and the input port 34*a* is communicated to the bypass port 36*a*, by a reduced diameter portion 182*a* of the valve spool 32*a*, to bypass the entire pump output to the sump 16*a*.

Referring again to FIG. 1, the operation of the FIG. 1 configuration, with the valving element 90*a* moved to the left to the second operating position, is as follows: Movement of the valving element 90*a* to the left as viewed in FIG. 1 to the second operating position, is effective to move a reduced diameter portion 186*a* of the valving element 90*a* to a position wherein the second fluid flow path 130*a*, from the second signal port 86*a* to the attenuation return passage 88*a*, is occluded. Thus fluid flow from the second area conduit 150*a* to the sump 16*b* by way of the one-way flow valve 152*a* and the second fluid flow path 130*a* is prevented.

At this same time, movement of the valving element 90*a* to the left is effective to communicate the work port 68*a* with the inlet port 72*a* by way of the reduced diameter portion 92*a* and the flat 98*a* so that the pressurized fluid from the inlet port 72*a* is supplied to a port 190*a* of the fluid-actuated device 22*a;* and the load signal passage 76*a* is communicated to the work port 68*a* by way of the reduced diameter portion 92*a*. Communication of the load signal passage 76*a* with the work port 68*a* is effective to pressurize the second area conduit 150*a* with the load-actuating pressure of the fluid-actuated device 22*a* and this load-actuating pressure is applied to the second fluid-responsive area 162*a* by way of the second area port 40*a*.

If a second area supply restrictor-valve 192*a* is connected between the pump pressure conduit 120*a* and the second area conduit 150*a*, then pressurized fluid from the pump 14*a* will be supplied to the second area conduit 150*a* by way of the second area supply restrictor-valve 192*a* and there will be a flow of this fluid through the load signal passage 76*a* and into the work port 68*a* and a port 190*a* of the fluid-actuated device 22*a*. This fluid being supplied by the pump to the second area conduit 150*a* will be pressurized by the load-actuating pressure as it flows toward the work port 68*a* and the device 22*a*.

However, if this second area supply restrictor-valve 192*a* is not provided to connect the pump pressure conduit 120*a* with the second area conduit 150*a*, then a small volume of fluid will be supplied from the work port 68*a* and the load signal passage 76*a*, at the load-actuating pressure of the device 22*a*, to pressurize the second area conduit 150*a* and to provide fluid to the second area port 40*a* for actuation of the valve spool 32*a* toward the operating mode, as shown. Blocking of the second fluid flow path 130*a* from the second signal port 86*a* to the sump 16*b*, as caused by moving the valving element 90*a* to the left to a second operating position, is also effective to provide pump pressure at the point 126*a* since fluid flow to the sump 16*b* has been occluded and the operator supply restrictor-valve 128*a* is supplying the pump pressure to the point 126*a*. Thus the pump pressure, at point 126*a* and in the conduit 132*a*, is applied to the signal valve operator 114*a*, moving the third area signal valve 24*a* to a position 194*a* wherein the flow path 144*a* is blocked. The result of the blocking of the flow path 144*a* is that the flow of pump pressure from the conduit 120*a* to the third area port 42*a* is precluded; and, instead the third area conduit 146*a* and the third area port 42*a* are pressurized with the load-actuating pressure by way of the second area conduit 150*a* and the pressure change restrictor-valve 148 *a*.

The resultant forces on the valve spool 32*a*, when the valving element 90*a* is moved to one of the operating positions, are as follows: Pump pressure is applied to the first fluid-responsive area 160*a* by way of the first area port 38*a*, the load-actuating pressure is applied to the second fluid-responsive area 162*a* by way of the second area port 40*a* and the second area conduit 150*a*, and the load-actuating pressure is applied to the third fluid responsive area 180*a* by way of the second area conduit 150*a* and the pressure change restrictor-valve 148*a*. Thus the load-actuating pressure is applied to both the second and the third fluid-responsive areas; and since these areas are on opposite ends of the valve spool 32*a* and since these areas differ in area by an area equal to the first fluid-responsive area 160*a*, a net equivalent area, which is equal to the first fluid-responsive area 160*a*, is provided which forces the valve spool 32*a* to the left as pressurized by the load-actuating pressure. At this same time, the total pump pressure, as applied to the first fluid-responsive area 160*a*, is forcing the valve spool 32*a* to the right.

Therefore, the first fluid-responsive area, being pressurized with the pump pressure, is forcing the valve spool 32*a* to the right, an area equivalent to the first fluid-responsive area 160*a* is being pressurized by the load-actuating pressure and is forcing the valve spool 32*a* to the left, and the spring 50*a* is forcing the valve spool 32*a* to the left; so that the valve spool 32*a* is actuated to communicate the input port 34*a* to the bypass port 36*a* and to bypass excess pump fluid from the pump 14*a* to the sump 16*a* whenever the pressure in the pump pressure conduit 120*a* exceeds that of the load-actuating pressure in the second area conduit 150*a* by a value which develops a force greater than that which is applied to the valve spool 32*a* by the spring 50*a*.

Referring again to FIG. 1, the operation of the FIG. 1 configuration, with the valving element 90*a* moved farther to the left, to a float position, is as follows: Movement of the valving element 90*a* to the left is effective to move a circular depression 196*a* of the valving element 90*a* to a position wherein the attenuation signal passage 84*a* is communicated with the attenuation return passage 88*a*; so that the second fluid flow path 130*a* is reestablished and fluid pressure in both the second area conduit 150*a* and the conduit 132*a* is reduced to that of the sump 16*b*. Relieving of the fluid pressure in the second area conduit 150*a* and the conduit 132*a* is effective to return the system to the standby position, as previously described; except that, now the work ports 68*a* and 70*a* are communicated to the return ports 64*a* and 66*a* respectively.

Summarizing the functioning of the system 10*a* of FIG. 1: The bypass valve 18*a* is actuated to the bypassing mode by pump pressure as applied to a large fluid-responsive area, when the valving element 90*a* is in its standby position. This large area is the sum total of the first fluid-responsive area 160*a* and the third fluid-responsive area 180*a*.

In contrast, the bypass valve is actuated to the bypassing mode by pump pressure as applied to a smaller area when the valving element 90*a* is in an operating position. This smaller area, which is the first fluid-responsive area 160*a*, requires a greater fluid pressure to overcome the force of the spring 50*a* than that required by the large area.

An equivalent area is provided which has an area that is equal in area and which is oppositely disposed to the first fluid-responsive area 160*a*. This area includes the second fluid-responsive area 162*a* and the third fluid-responsive area 180*a*. This equivalent area is pressurized by the load-actuating pressure when the valving element 90*a* is in an operating position.

Thus equal and opposing areas, which are smaller than the large area, are pressurized by the pump pressure and the load-actuating pressure when the valving element is in an operating position. The result is that a larger pressure differential between the pump and the load-actuating pressure is required to move the valve spool 32*a* to a bypassing mode when the control valve 20*a* is in an operating position than the difference between the pump pressure and the sump pressure when the control valve 20*a* is in the standby position; and so the standby pressure is low in comparison to the differential operating pressure.

Now, summarizing some salient features of the system 10*a* of FIG. 1: When the movable valving element 90*a* is in the standby position as shown, the pump pressure is applied to the third fluid-responsive area 180*a* and the third fluid-responsive area 180*a* is adapted to urge the valve spool 32*a* toward the bypassing mode. Also, when the valving element 90*a* is moved to an operating position and the second area conduit 150*a* is pressurized with the load-actuating pressure of the fluid-actuated device 22*a*, the third fluid-responsive area 180*a* is pressurized with the load-actuating pressure.

The directional control valve 20*a* provides a first fluid flow path 200*a* which includes the load signal passage 78*a* and the first signal port 80*a*.

The directional control valve 20*a* includes the second fluid flow path 130*a* that includes the second signal port 86*a*, the attenuation signal passage 84*a* and the attenuation return passage 88*a*.

The system 10*a* includes a second area signal means 204*a*, for the application of fluid pressures to the second fluid-responsive area 162*a*; and the second area signal means 204*a* includes the second area conduit 150*a*, the first fluid flow path 200*a*, the one-way flow valve 152*a*, and the second fluid flow path 130*a*.

Finally, the system 10*a* includes a third area signal means 206*a*, for application of fluid pressures to the third fluid-responsive area 180*a*. The third area signal means 206*a* includes the third area signal valve 24*a* for the application of pump pressure to the third fluid-responsive area 180*a*, the pressure change restrictor-valve 148*a*, the second area conduit 150*a*, the second fluid flow path 130*a*, and the operator supply restrictor-valve 128*a*.

SIMILARITIES OF THE EMBODIMENTS

There is considerable similarity among all five of the configurations; so that the configurations of FIGS. 2 – 5 will be discussed in considerably less detail. In particular, the directional control valves 20, of each of the configurations, are similar except with respect to those portions which provide a first fluid flow path 200 and/or a second fluid flow path 130. Therefore only those portions which relate to the first and second flow paths 200 and 130, will be discussed in conjunction with the descriptions of FIGS. 2 – 5.

There is also considerable similarity in all five of the configurations as to the bypass valves 18. Thus the bypass valves 18, of FIGS. 2 – 5 will be discussed in considerably less detail, it being understood that each of the bypass valves 18 is urged toward an operating mode by a spring 50 and is urged toward a bypassing mode by a first fluid-responsive area 160.

In addition, there is considerable similarity in the connections between these bypass valves 18 and the directional control valves 20, there being three points of connection which are graphically illustrated by showing discontinuities in these three conduits intermediate of the bypass valves 18 and the directional control valves 20.

The numbers which are used to identify the various parts of the configurations in FIGS. 1 – 5 each include a numeral and a suffix letter. The use of the same numeral in different figures is indicative that the name of the part is identical, the functioning of the part is either similar or identical, and the part is either similar or identical.

The suffix letter for each of the part numbers, except for those applied to the sumps 16, are assigned in alphabetical sequence in relation to the figure numbers. Since many sumps are represented on each figure, for the purpose of clarity in reducing the number of return and drain lines, the suffix letters are assigned as needed on each figure; but generally the same suffix letter is used for the same function in each of the figures.

Where the description does not include the naming of all of the parts which are numbered on the drawings, the names thereof can be taken from part numbers which have the same numerals and which are named along with the description of another figure.

DESCRIPTION OF THE FIG. 2 EMBODIMENT

Figure 2:
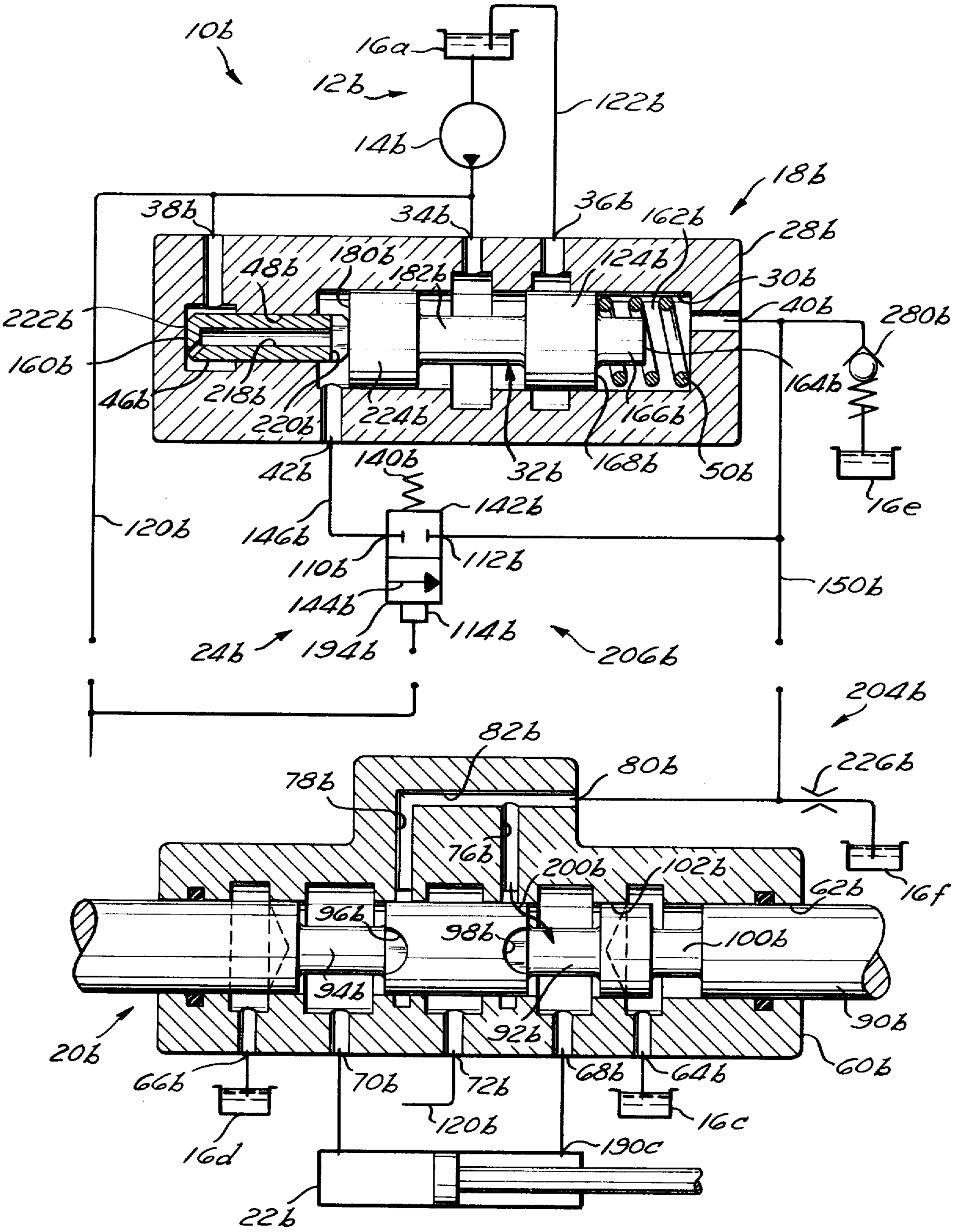
FIG. 2 is a schematic drawing of a second embodiment of the invention, showing both the differential pressure actuated bypass valve thereof and the directional control valve thereof in cross-section.

Referring now to FIG. 2, a load-responsive hydraulic system, generally indicated at 10*b*, includes a differential pressure actuated bypass valve 18*b*, a directional control valve 20*b*, and a third area signal valve 24*b*.

The bypass valve 18*b* includes a housing 28*b* having a spool bore 30*b* therein and a valve spool 32*b* slidably fitted into the spool bore 30*b*. The housing 28*b* further includes a plunger bore 48*b* having a plunger 46*b* being slidably inserted therein. The plunger 46*b* includes a first fluid-responsive area 160*b* which comprises a projected-end area thereof, a longitudinal hole 218*b*, and a third area supply restrictor-valve 222*b* which comprises an orifice communicating the first fluid-responsive area 160*b* with the longitudinal hole 218*b*. The bypass valve 18*b* further includes a second area port 40*b* and a second fluid-responsive area 162*b*. The second fluid-responsive area 162*b* includes a projected-end area 164*b* of the stop portion 166*b* and an annular projected-end area 168*b* which lies radially outward from the stop portion 166*b* to the outside diameter of a spool land 124*b*. The housing 28*b* also includes a third area port 42 *b*. The bypass valve 18*b* includes a third fluid-responsive area 180*b* which comprises the projected-end of that portion of a spool land 224*b* that lies radially outward from the outside diameter of the plunger 46*b* to the outside diameter of the spool land 224*b*.

Referring again to FIG. 2, the functioning of the FIG. 2 configuration, when a valving element 90*b* is in the standby position, as shown, is as follows: Pump pressure is applied to the signal valve operator 114*b* by way of the pump pressure conduit 120*b;* but the third area signal valve 24*b* is maintained in the first position 142*b* as shown by the spring 140*b;* since the force of the spring 140*b* is predetermined to a magnitude that will hold the third area signal valve 24*b* in the first position 142*b* while the valve spool 32*b* is being actuated to the bypassing mode against the opposition of the spring 50*b*.

With a flow path 144*b* in the third area signal valve 24*b* blocked by action of the spring 140*b*, pump pressure is applied to a first area port 38*b* and the first fluid-responsive area 160*b* by the pump pressure conduit 120*b*. This pump pressure in the first area port 38*b* is also applied to the third area supply restrictor-valve 222*b* so that restricted fluid communication is made from the pump 14*b* to the third fluid-responsive area 180*b* by way of the longitudinal hole 218*b* and a cross-slot 220*b*. Since communication between the third area port 42*b* and the second area conduit 150*b* is occluded by the third area signal valve 24*b*, the pump pressure that is delivered to the third fluid-responsive area 180*b* by the third area supply restrictor-valve 222*b* assists the pump pressure, as applied to the first fluid-responsive area 160*b*, to move the valve spool 32*b* to the right against the opposition of the spring 50*b*. *It should be noted that, at this time, the second fluid-responsive area 162b* is communicated to a sump 16*f* by the second area conduit 150*b* and a second area attenuation restrictor-valve 226*b*. Thus the valve spool 32*b* is moved to the right, to a bypassing mode, by an area which is the sum of the first fluid-responsive area 160*b* and the third fluid-responsive area 180*b*.

When the valving element 90*b* is moved to the left, or to the right, to an operating position, one of the work ports 68*b* or 70*b* is communicated to the second area conduit 150*b* by one of the load signal passages 76*b* or 78*b*. The application of the load-actuating pressure of the device 22*b* from one of the ports 68*b* or 70*b* to the second area conduit 150*b* and to the second fluid-responsive area 162*b* is effective to assist the spring 50*b* in moving the valve spool 32*b* to the left, as viewed in FIG. 1, toward the operating mode. Movement of the valve spool 32*b* toward the operating mode is effective to restrict the bypassing of fluid from the pump 14*b* to the sump 16*b* through an input port 34*b* and a bypass port 36*b* so that the pressure of the pump 14*b* is increased.

This increase in the pressure of the pump 14*b* increases the pressure which is applied to the signal valve operator 114*b* to the pump pressure conduit 120*b*, thereby overcoming the load of the spring 140*b* and moving the third area signal valve 24*b* from the first position 142*b*, as shown, to a second position 194*b* wherein the flow path 144*b* is established between a first valved port 110*b* and a second valved port 112*b*. This establishing of the flow path 144*b* is effective to reduce the magnitude of the fluid pressure, as applied to the third fluid-responsive area 180*b*, to the pressure level of the load-actuating pressure in the second area conduit 150*b*.

The result is that, when pressurized fluid is being supplied from the pump 14*b* to the device 22*b*, the valve spool 32*b* is urged to the right by the pump pressure applied to the first fluid-responsive area 160*b*, the valve spool 32*b* is urged to the left by an area which is equal to the second fluid-responsive area 162*b* minus the third fluid-responsive area 180*b*, and the valve spool 32*b* is urged to the left by the spring 50*b*.

It should be understood that movement of the valving element 90*b* to the left establishes a fluid flow path 200*b*, between the load signal passages 76*b* and the work port 68*b*, that has a fluid conductance appreciably greater than that of the second area attenuation restrictor-valve 226*b*. So the full load-actuating pressure of one of the work ports, 68*b* or 70*b*, is applied to the second area conduit 150*b* and to the third fluid-responsive area 180*b* when the valving element 90*b* is moved to one of the operating positions and when the fluid pressure in the pump pressure conduit 120*b* is sufficient to actuate the third area signal valve 24*b* to the second position 194*b* wherein the flow path 144*b* is established.

Thus, in both the FIG. 1 and the FIG. 2 embodiments, pump pressure is applied to the third fluid-responsive area, 180*a* or 180*b*, under standby conditions and the load-actuating pressure is applied to the third fluid-responsive area, 180*a* or 180*b*, under operating conditions. The FIGS. 1 and 2 configurations are also similar in that the third fluid-responsive areas 180*a* and 180*b* are both disposed to provide a force for actuating of the respective valve spools, 32*a* or 32*b*, to the right toward the bypassing mode.

Referring again to FIG. 2, the directional control valve 20*b* provides a first fluid flow path 200*b* which includes the first signal port 80*b* and the load signal passage 76*b*. It should be noted that the directional control valve 20*b* of the FIG. 2 configuration does not include an attenuation signal passage nor an attenuation return passage; so the directional control valve 20*b* does not provide a second fluid flow path such as the second fluid flow path 130*a* of the FIG. 1 configuration.

The FIG. 2 configuration includes a second area signal means 204*b* which comprises the first fluid flow path 200*b*, the second area conduit 150*b*, and the second area attenuation restrictor-valve 226*b*. The second area signal means 204*b* is effective to apply sump pressure to the second fluid-responsive area 162*b* when the valving element is in the standby position, as shown, and is effective to apply the load-actuating pressure of the fluid-actuated device 22*b* to the second fluid-responsive area 162*b* when the valving element 90*b* is moved to an operating position.

The system 10*b* of the FIG. 2 configuration also includes a third area signal means 206*b*. The third area signal means 206*b* includes the third area signal valve 24*b*, the third area conduit 146*b*, and the third area supply restrictor-valve 222*b*. The third area signal means 206*b* is effective to apply the pump pressure to the third fluid-responsive area 180*b* when the valving element 90*b* is in the standby position, as shown; and the third area signal means 206*b* is effective to apply the load-actuating pressure of the fluid-actuated device 22*b* to the third fluid-responsive area 180*b* when the pump 14*b* supplies pressurized fluid to the fluid-actuated device 22*b*.

Figure 3:
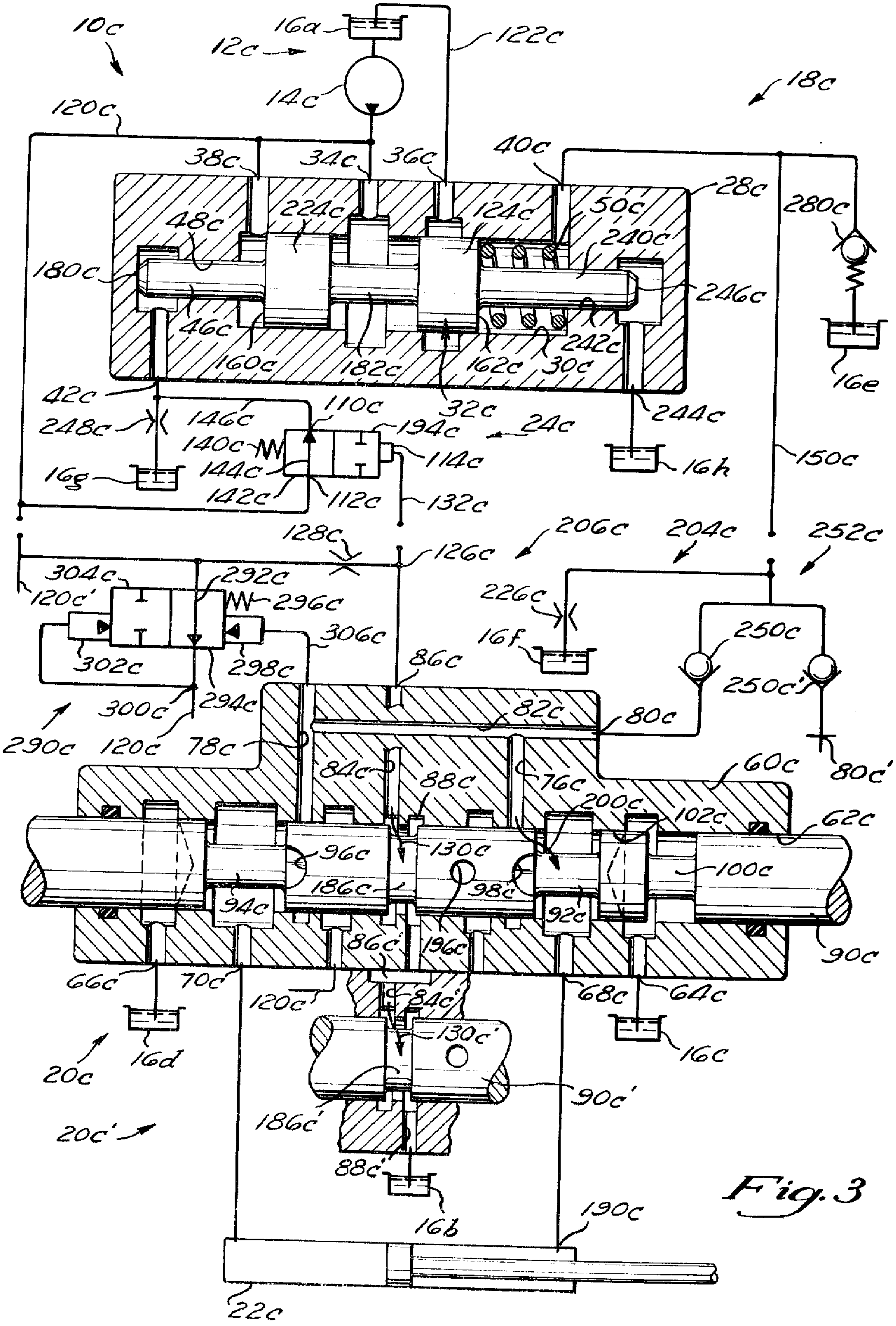
FIG. 3 is a schematic drawing of a third embodiment of the invention, showing both the differential pressure actuated bypass valve thereof and the directional control valve thereof in cross-section, and showing a portion of a second directional control valve in cross-section.

DESCRIPTION OF THE FIG. 3 EMBODIMENT:

Referring now to FIG. 3, a load-responsive hydraulic system, generally depicted at 10*c*, includes a differential pressure actuated bypass valve 18*c*, a directional control valve 20*c*, and a third area signal valve 24*c*.

The bypass valve 18*c* includes a first area port 38*c*, a first fluid-responsive area 160*c* which comprises the projected-end area of that portion of a spool land 224*c* which lies radially outward from a plunger 46*c*, a second area port 40*c*, a second fluid-responsive area 162*c* which comprises that portion of a spool land 124*c* which lies radially outward from a plunger 240*c*, a third area port 42*c*, and a third fluid-responsive area 180*c* which comprises the projectedend area of the plunger 46*c*. The bypass valve 18*c* also includes a plunger bore 48*c* slidably receiving the plunger 46*c*, a plunger bore 242*c* slidably receiving the plunger 240*c*, and a drain port 244*c*.

The directional control valve 20*c* is identical to the directional control valve 20*a* of FIG. 1; and the third area signal valve 24*c* is identical to the third area signal valve 24*a* of FIG. 1.

The FIG. 3 illustration also includes the cross-section of a portion of another directional control valve 20*c'*. The directional control valve 20*c'* includes another second signal port 86*c'*, another attenuation signal passage 84*c'*, another attenuation return passage 88*c'*, and another movable valving element 90*c'* having another reduced diameter portion 186*c'*, all cooperating to provide another second fluid flow path 130*c'*.

The functioning of the FIG. 3 configuration with both of the directional control valves 20*c* and 20*c'* in their neutral positions, is as follows: The second fluid flow paths 130*c* and 130*c'* are both established when the directional control valves 20*c* and 20*c'* are in their standby positions. Thus, with the second fluid flow paths 130*c* and 130*c'* being connected in series, a fluid flow path is established from the second signal port 86*c* to the sump 16*b*.

With the directional control valves 20*c* and 20*c'* in the standby position, pump pressure from the pump 14*c* is supplied to the pump pressure conduit 120*c*, pressure is drained from a conduit 132*c* and a point 126*c* through the series-connected second fluid flow paths 130*c* and 130*c'* and to the sump 16*b*, pressure is drained from the second fluid-responsive area 162*c* and the second area port 40*c* to a sump 16*f* via a second area conduit 150*c* and a second area attenuation restrictor-valve 226*c*.

At this time, pump pressure is applied to the first fluid-responsive area 160*c* via the first area port 38*c*, pump pressure is applied to the third fluid-responsive area 180*c* via the third area signal valve 24*c* and a flow path 144*c* therein, only the pressure of the sump 16*f* is applied to the second fluid-responsive area 162*c*, and only the pressure of a sump 16*h* is applied to a fourth area 246*c* which is provided by the projected-end area of the plunger 240*c*. Thus pump pressure is applied to the first fluid-responsive area 160*c* and to the third fluid-responsive area 180*c*, the total area being equivalent to a projected-end area of the valve spool 32*c*. A very low pump pressure is able to actuate the valve spool 32*c* to the right, to a bypassing mode since only sump pressures are applied to the second fluid-responsive area 162*c* and the fourth area 246*c*.

When either of the directional control valves 20*c* or 20*c'* is moved to an operating position, the respective one of the second fluid flow paths 130*c* or 130*c'*, is blocked. At this time fluid pressure builds up in the conduit 132*c* because of fluid being supplied from the pump pressure conduit 120*c* to the conduit 132*c* through the operator supply restrictor-valve 128*c*. This buildup of pressure in the conduit 132*c* is effective to pressurize the signal valve operator 114*c* and to move the third area signal valve 24*c* to a position 194*c* in which the flow path 144*c* is blocked. The blocking of the flow path 144*c* shuts off the supply of pump pressure to a third area conduit 146*c*; and so a third area attenuation restrictor-valve 248*c* is effective to relieve the pressure on the third fluid-responsive area 180*c* by a connection to a sump 16*g*.

At the same time, with one of the directional control valves 20*c* or 20*c'* still actuated to an operating position, a load signal passage 76*c* or 78*c* in the directional control valve 20*c*, or a load signal passage (not shown, same as 76*c* or 78*c*) in the directional control valve 20*c'* is connected to a work port 68*c* or 70*c* in the directional control valve 20*c* or to a work port (not shown, same as 68*c* or 70*c*) in the directional control valve 20*c'*; so that the load-actuating pressure of a fluid-actuated device 22*c* or of a second fluid-actuated device (not shown, same as 22*c*) is applied to a first signal port 80*c* in the directional control valve 20*c* or to another first signal port 80*c'*, same as 80*c*, which is symbolically represented in the FIG. 3 illustration. The load-actuating pressure from one of the fluid-actuated devices is transmitted to the second area signal conduit 150c and to the second fluid-responsive area 162c by the one of a pair of logic check valves, 250c or 250c', which are connected respectively to the first signal ports, 80c and 80c'.

If both of the movable valving elements 90c and 90c' are moved to their operating positions, then load-actuating pressures of the fluid-actuated device 22c is supplied to the logic check valve 250c and the load-actuating pressure of the second fluid-actuated device (not shown) is supplied to the logic check valve 250c. The load-actuating pressure which is the highest is effective to open the respective ones of the check valves 250c or 250c' and to transmit this high load-actuating pressure to the second area conduit 150c.

Whenever this highest load-actuating pressure is reduced, either by a reduction of a load (not shown) on one of the fluid-actuated devices or by a return of one of the valving elements 90c or 90c' to its standby position, the fluid pressure in the second area conduit 150c is reduced to the new highest load-actuating pressure, if any, by fluid flow from the second area conduit 150c to the sump 16f by way of the second area attenuation restrictor-valve 226c.

Referring again to FIG. 3, with one or both of the movable valving elements 90c and 90c' in the operating position, pump pressure is applied to the first fluid-responsive area 160c by way of the first area port 38c, the highest load-actuating pressure is applied to the second fluid-responsive area 162c which is equal in area to the first fluid-responsive area 160c, no fluid pressure is applied to the third fluid-responsive area 180c because of the connection of the third area port 42c with the sump 16g via the third area attenuation restrictor-valve 248c, and no fluid pressure is applied to the fourth area 246c because of the connection of the drain port 244c with the sump 16h.

Thus the bypass valve 18c is actuated from the operating mode as shown to a bypassing mode wherein the input port 34c is connected to the bypass port 36c by the difference between the pump pressure and the load-actuating pressure as applied to the first fluid-responsive area 160c and the second fluid-responsive area 162c respectively; and since these fluid pressures are acting upon areas which are smaller than the area which was used to actuate the valve spool 32c to its bypassing mode during standby conditions, the bypass valve 18c controls the pressure of the pump 14b to a higher differential pressure above the load-actuating pressure than the difference between pump and sump pressures when the system is operating at standby conditions.

Referring again to FIG. 3, the bypass valve 18c is similar to the bypass valve 18a and 18b of the FIG. 1 and FIG. 2 embodiments respectively in that the third fluid-responsive area 180c is disposed to actuate the valve spool 32c to the bypass mode; however the bypass valve 18c is different from the bypass valves 18a and 18b in that sump pressure is applied to the third fluid-responsive area 180c during operating conditions of the system whereas in the FIGS. 1 and 2 configurations, the load-actuating pressure was applied to the third fluid-responsive areas 180a and 180b during operating conditions.

Considering again the embodiment of FIG. 3 and summarizing, the directional control valve 20c includes a first fluid flow path 200c which comprises the first signal port 80c and the load signal passage 76c. The directional control valve 20c includes a second fluid flow path 130c which comprises the second signal port 86c, the attenuation signal passage 84c and the attenuation return passage 88c. In like manner, the directional control valve 20c' includes a first fluid flow path (not shown, same as 200c) which comprises another first signal port 80c' and another load signal passage (not shown, same as 76c); and the second directional control valve 20c' includes another second fluid flow path 130c' which comprises another second signal port 86c', another attenuation signal passage 84c', and other attenuation return passage 88c'.

The FIG. 3 embodiment also includes a logic system or means, generally depicted at 252c, which includes the logic check valves 250c and 250c' and the second area attenuation restrictor-valve 226c. The logic system 252c is effective to select the highest load-actuating pressure being supplied to one of the logic check valves, 250c or 250c', and to deliver this highest pressure to the second area conduit 150c. The logic system 252c is also effective to reduce the fluid pressure in the second area conduit 150c whenever this highest load-actuating pressure is reduced.

The FIG. 3 embodiment also includes a second area signal means 204c. The second area signal means 204c comprises the first fluid flow path 200c, the logic system 252c, and the second area conduit 150c.

The FIG. 3 embodiment further includes a third area signal means 206c. The third area signal means 206c comprises the seriesconnected second fluid flow paths 130c and 130c', the third area signal valve 24c, the operator supply restrictor-valve 128c, and the third area attenuation restrictor-valve 248c.

DESCRIPTION OF THE FIG. 4 EMBODIMENT

Figure 4:
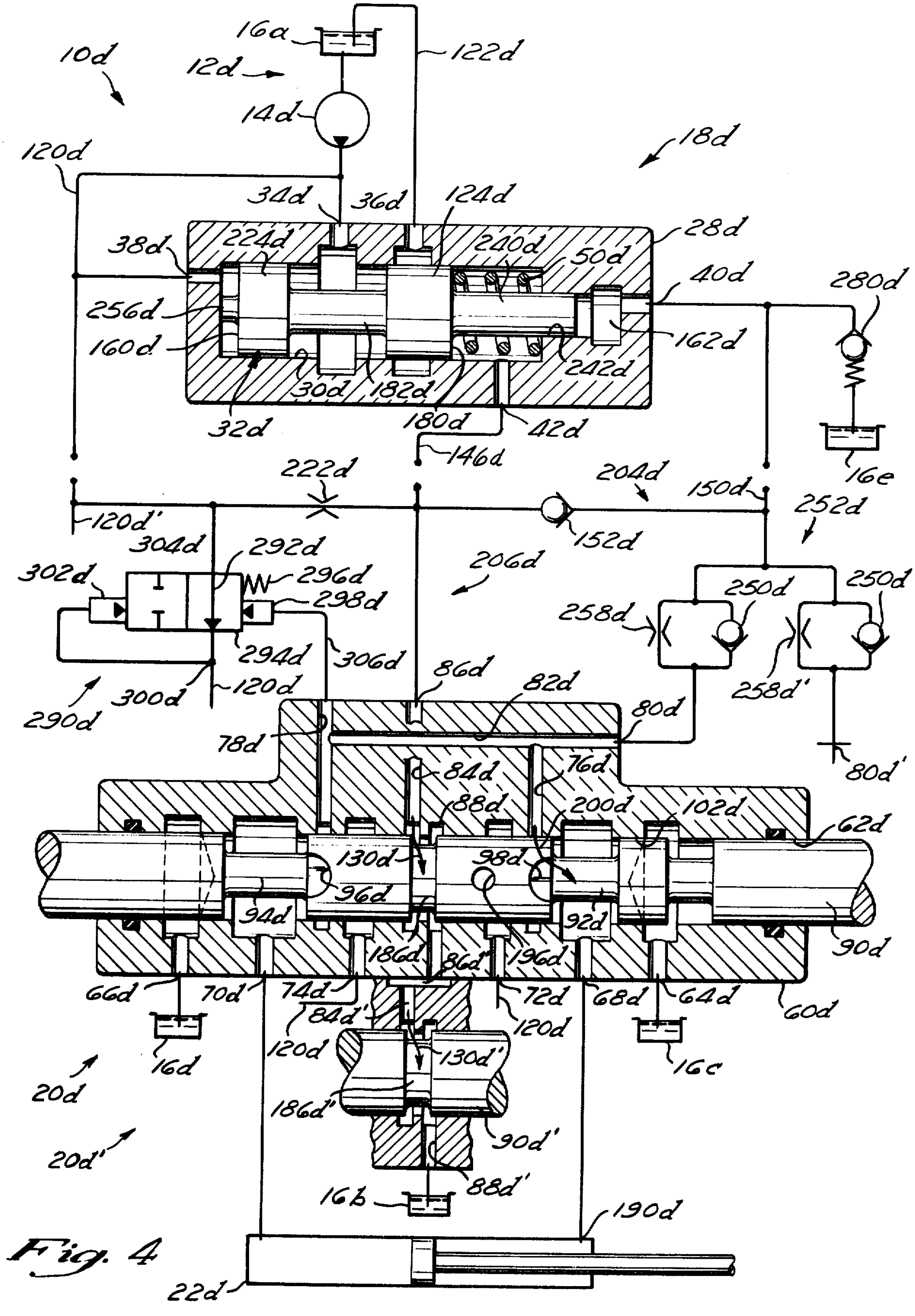
FIG. 4 is a schematic drawing of a fourth embodiment of the invention, showing both the differential pressure actuated bypass valve thereof and the directional control valve thereof in cross-section, and showing a portion of a second directional control valve in cross-section.

Referring now to FIG. 4, a load-responsive hydraulic system, depicted generally at 10d, includes a differential pressure actuated bypass valve 18d, a directional control valve 20d that is identical to the directional control valves 20a and 20c of FIGS. 1 and 3 respectively, and a second directional control valve 20d' that is identical to both the directional control valve 20d in the FIG. 4 embodiment and the directional control valves 20a and 20c of the FIG. 1 and FIG. 3 embodiments respectively.

The bypass valve 18d includes a first area port 38d, a first fluid-responsive area 160d which includes the projected-end area of a stop portion 256d and the projected-end area of that portion of a spool land 224d which lies radially outward from the stop portion 256d, a second area port 40d, a second fluid-responsive area 162d which comprises the projected-end area of a plunger 240d, a third area port 42d, and a third fluid-responsive area 180d which comprises the projected-end area of that portion of a spool land 124d which lies radially outward from the plunger 240d.

Referring again to FIG. 4, the functioning of the system 10d, when both of the movable valving elements 90d and 90d' are in their respective standby positions is as follows: Pump pressure is applied to the first fluid-responsive area 160d by way of the first area port 38d. Only sump pressure is applied to the second fluid-responsive area 162d because of communication of the second area port 40d with a sump 16b via the second area conduit 150d, a one-way flow valve 152d, a second signal port 86d, and the series-connected second fluid flow paths 130d and 130d' of the directional control valves 20d and 20d' respectively. Only sump pressure is applied to the third fluid-responsive area 180*d* because of the connection of the third area port 42*d* to the sump 16*b* via the second signal port 86*d* and the series-connected second fluid flow paths 130*d* and 130*d'*. Thus the pump pressure, as applied to the first fluid-responsive area 160*d*, is able to actuate the valve spool 32*d* to the bypassing mode by a pressure which is only large enough to overcome the load of a spring 50*d*.

Referring again to FIG. 4, the functioning of the system 10*d*, with both of the movable valving elements 90*d* and 90*d'* moved to one of their operating positions, is as follows: Pump pressure is applied to the first fluid-responsive area 160*d* by way of the first area port 38*d*. Pump pressure is also applied to the third fluid-responsive area 180*d* by way of a pump pressure conduit 220*d*, a third area supply restrictor-valve 222*d*, and a third area conduit 146*d*.

At this time, both of the second fluid flow paths 130*d* and 130*d'* are occluded by the movement of the valving elements 90*d* and 90*d'* to their operating positions; and fluid flow from the third area conduit 146*d* to the second area conduit 150*d* is always prevented by the one-way flow valve 152*d*. In addition to the application of pump pressure to the first fluid-responsive area 160*d* and the third fluid-responsive area 180*d*, the higher of the load-actuating pressures, as selected by a pair of logic check valves 250*d* and 250*d'*, is applied to the second fluid-responsive area 162*d'*.

Thus the pump pressure, as applied to the third fluid-responsive area 180*d*, is in opposition to the pump pressure as applied to the first fluid-responsive area 160*d* so that the valve spool 32*d* is urged to the right, toward the bypassing mode, by an area equal to and opposite to the second fluid-responsive area 162*d*.

Again it can be seen that when one or both of the movable valving elements 90*d* and 90*d'* are moved to one of their operating positions, the bypass valve 18*d* functions to control the pressure of the pump 14*d* to a higher differential above the load-actuating pressure that is in the second area conduit 150*d* than the differential pressure at which the bypass valve 18*d* controls the pressure of the pump 14*d* above sump pressure when both of the valving elements 90*d* and 90*d'* are in their standby positions.

A pair of logic restrictor-valves 258*d* and 258*d'* are connected in parallel to the logic check valves 250*d* and 250*d'* respectively. When only one of the directional control valves, 20*d* or 20*d'*, is moved to an operating position and then the load-actuating pressure decreases while the pump is supplying fluid to the fluid-actuated device, the pressure in the second area conduit 150*d* is reduced by fluid flow to the fluid-actuated device receiving pump fluid, through the respective one of the logic restrictor-valves.

When both of the directional control valves, 20*d* and 20*d'*, are supplying fluid from the pump 14*d* to their respective fluid-actuated devices at two different load-actuating pressures, the higher load-actuating pressure is supplied to the second area conduit 150*d* by the respective one of the logic check valves 250*d* or 250*d'*. Some fluid from the second area conduit 150*d* is delivered to one of the first signal ports, 80*d* or 80*d'*, and the fluid-actuated device having the lower load-actuating pressure. The higher load-actuating pressure is maintained in the second area conduit 150*d*, in spite of this fluid flow to one of the first signal ports, 80*d* or 80*d'*, having the lower load-actuating pressure; because the fluid conductance of the logic check valves 250*d* and 250*d'* is much greater than the fluid conductance of the logic restrictor-valves 258*d* and 258*d'*.

Referring again to FIG. 4 and summarizing, the third fluid-responsive area 180*d* is adapted to urge the valve spool 32*d* toward the operating mode; and the third fluid-responsive area 180*d* is in opposition to the first fluid-responsive area 160*d*. Also, the third fluid-responsive area 180*d* comprises that portion of the spool land 124*d* which lies radially outward from the plunger 240*d*.

The directional control valve 20*d* includes a first fluid flow path 200*d* which comprises a first signal port 80*d* and a load signal passage 76*d;* and the directional control valve 20*d'* includes another first fluid flow path (not shown, same as 200*d*) which comprises another first signal port 80*d* (symbolically represented) and another load signal passage (not shown, same as 76*d*).

The directional control valve 20*d* includes a second fluid flow path 130*d* which comprises a second signal port 86*d*, an attenuation signal passage 84*d*, and an attenuation return passage 88*d*. In like manner, the directional control valve 20*d'* includes another second fluid flow path 130*d'* which comprises another second signal port 86*d'*, another attenuation signal passage 84*d'*, and another attenuation return passage 88*d'*.

The load-responsive hydraulic system 10*d* includes a logic means 252*d* which comprises the logic valves 250*d* and 250*d'* and the logic restrictor-valves 258*d* and 258*d'*. The logic restrictor-valves 258*d* and 258*d'* are connected in parallel to the logic check valves 250*d* and 250*d'*. The logic restrictor-valves 258*d* and 258*d'* provide a reducing means or returning means for returning excess fluid pressure from the second area conduit 150*d* to one of the work ports 68 or 70 and for reducing the highest fluid-actuating pressure, as applied to the second area conduit 150*d*, whenever the pump 14*d* is no longer supplying a load-actuating pressure of this great a magnitude to one of the fluid-actuated devices.

The system 10*d* also includes a second area signal means 204*d*. The second area signal means 204*d* includes the first fluid flow path 200*d*, the logic means 252*d*, the one-way flow valve 152*d*, and the series-connected second fluid flow paths 130*d* and 130*d'*.

Finally, the system 10*d* includes a third area signal means 206*d* which comprises the series-connected second fluid flow paths 130*d* and 130*d'* and also the third area supply restrictor-valve 222*d*.

Figure 5:
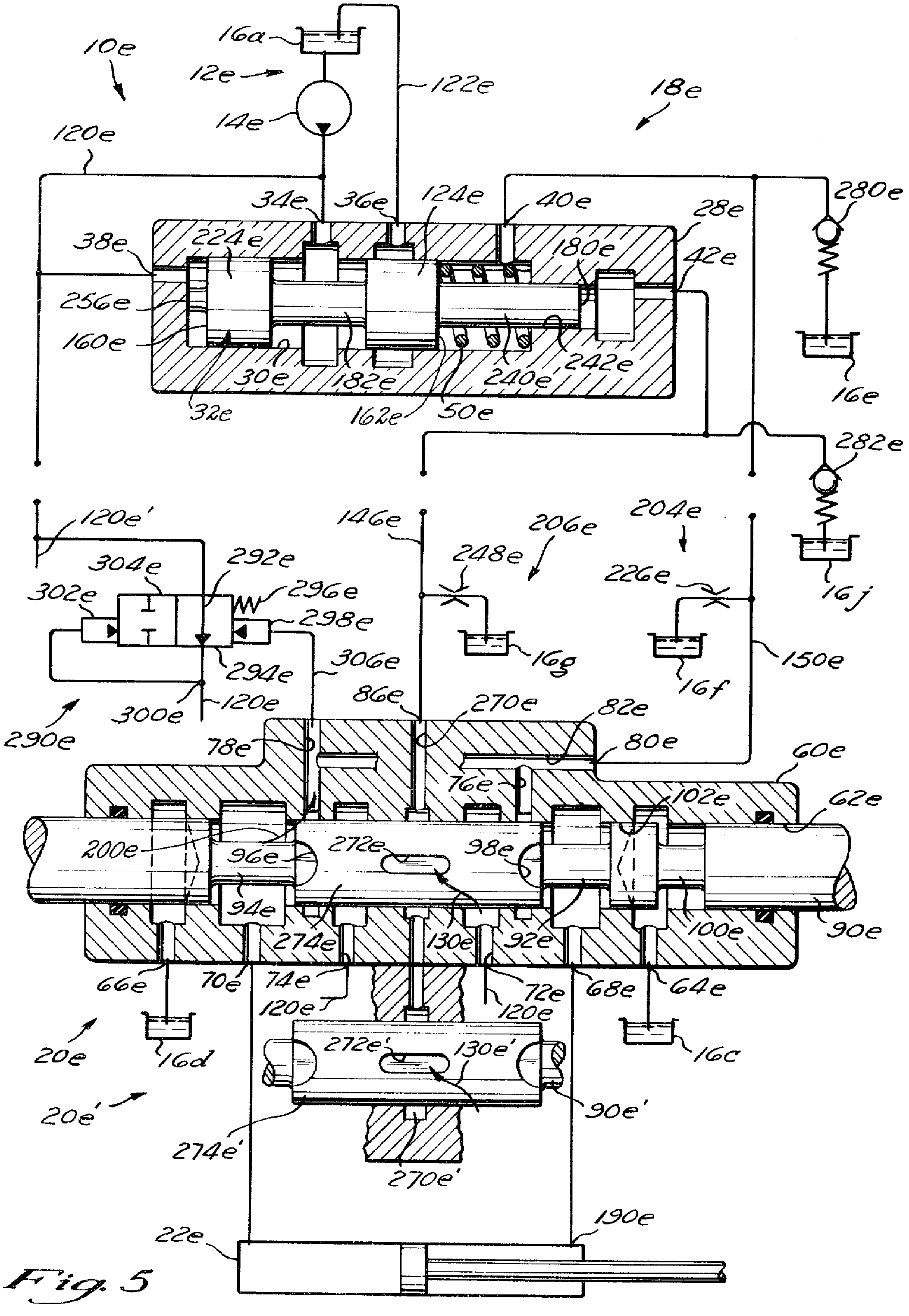
FIG. 5 is a schematic drawing of a fifth embodiment of the invention, showing both the differential pressure actuated bypass valve thereof and the directional control valve thereof in cross-section, and showing a portion of a second directional control valve in cross-section.

DESCRIPTION OF THE FIG. 5 EMBODIMENT:

Referring now to FIG. 5, the load-responsive hydraulic system of FIG. 5, generally depicted at 10*e*,includes a differential pressure actuated bypass valve 18*e* and a directional control valve 20*e*.

The bypass valve 18*e* is identical to the bypass valve 18*d* of the FIG. 4 configuration, except for the location of the second area port 40*e*. The bypass valve 18*e* includes a first area port 38*e*, a first fluid-responsive area 160*e*, the second area port 40*e*, a second fluid-responsive area 162*e*, a third area port 42*e*, and a third fluid-responsive area 180*e*.

The direction control valve 20*e* is the same as the directional control valves of the FIGS. 1, 3, and 4 embodiments except that the directional control valve 20*e* does not include an attenuation signal passage nor an attenuation return passage. Instead, the directional control valve 20*e* includes a pressure signal passage 270*e*. The pressure signal passage 270*e* includes a portion which serves as a second signal port 86*e* and the pressure signal passage 270*e* intercepts the element bore 62*e* intermediate of a pair of inlet ports 72*e* and 74*e*. An elongated recess 272*e* in a spool land 274*e* of the valving element 90*e* is effective to communicate the pressure signal passage 270*e* with the inlet port 72*e* when the valving element 90*e* is moved to the right as viewed in FIG. 5 and is effective to communicate the pressure signal passage 270*e* to the inlet port 74*e* when the movable valving element 90*e* is moved to the left as viewed in FIG. 5. Thus the movement of the valving element 90*e* to the right is effective to establish a second fluid flow path 130*e* from the inlet port 72*e* to the second signal port 86*e* wherein fluid pressure from the pump pressure conduit 120*e* is applied to a third area conduit 146*e*.

The functioning of the system 20*e*, with the movable valving element 90*e* in the standby position as shown, is as follows: Pump pressure is applied to the first fluid-responsive area 160*e* by way of the first area port 38*e*. No pressure is applied to the second fluid-responsive area 162*e* because of the communication of the second area port 40*e* with a sump 16*f* through a second area attenuation restrictor-valve 226*e*; and no fluid is applied to the third fluid-responsive area 180*e* because of the communication of the third area port 42*e* with a sump 16*g* by way of a third area attenuation restrictor-valve 248*e*.

When the movable valving element 90*e* is moved to the right, to a first operating position, a first fluid flow path 200*e* is established between a first signal port 80*e* and a work port 70*e* via a load signal passage 78*e*; and the second fluid flow path 130*e* is established between the second signal port 86*e* and the inlet port 72*e* via the elongated recess 272*e* thereby supplying pump pressure to the third area conduit 146*e*. Thus pump pressure is applied to the first fluid-responsive area 160*e* and the third fluid-responsive area 180*e* so that the pump pressure is applied to an area which is equivalent to the area of second fluid-responsive area 162*e* but which urges the valve spool 32*e* to the right. At the same time, the first fluid flow path 200*e* is effective to apply the load-actuating pressure of a fluid-actuated device 22*e* to the second fluid-responsive area 162*e*.

The result is that the bypass valve 18*e* is actuated to standby and bypassing modes by fluid-responsive areas which are smaller in effective area than the area which actuated the valve spool 32*e* to the bypassing mode when the valving element 90*e* was in its standby position. So the pressure of a pump 14*e* is maintained at a higher differential pressure above the load-actuating pressure when the valving element 90*e* is in an operating position than the differential pressure at which the pump 14*e* is controlled above the sump pressure when the valving element 90*e* is in its standby position.

The FIG. 5 illustration also includes a cross-section of a portion of a second directional control valve 20*e*′. The directional control valve 20*e*′ includes another pressure signal passage 270*e*′, another pair of inlet ports (not shown, same as 72*e* and 74*e*), and a second valving element 90*e*′ which all cooperate to provide means for establishing another second fluid flow path (not shown, same as 130*e*). The second fluid flow paths are connected in parallel; so that either one is able to establish a second fluid flow path from the second signal port 86*e* to the pump 14*e*.

Summarizing, the bypass valve 18*e* of the system 10*e* of FIG. 5 includes a third fluid-responsive area 180*e* which is disposed to actuate the valve spool 32*e* toward its operating mode and which is disposed to oppose the first fluid-responsive area 160*e*. The third fluid-responsive area 180*e* comprises the projected end of the plunger 240*e* whereas, in the FIG. 4 configuration, the third fluid-responsive area 180*d* comprised the annular projected-end portion between the plunger 240*d* and the outside diameter of the spool land 124*d*.

The directional control valve 20*e* provides a first fluid flow path 200*e* which comprises the first signal port 80*e* and a load signal passage 76*e*. The directional control valve 20*e* also provides a second fluid flow path 130*e* which comprises the second signal port 86*e*, the pressure signal passage 270*e*, and the elongated recess 272*e*. In like manner, an identical valve, 20*e*′, is effective to establish another fluid flow path which comprises another pressure signal passage 270*e*′ and other elongated recess 272*e*′.

The system 10*e* of FIG. 5 also includes a second area signal means 204*e* which comprises the first fluid flow path 200*e*, a second area conduit 150*e*, and the second attenuation restrictor-valve 226*e*.

Finally, the system 10*e* of FIG. 5 includes a third area signal means 206*e* which comprises the parallel connection of the second fluid flow path 130*e* and the corresponding path in directional control valve 20*e*′, the third area conduit 146*e*, and the third area attenuation restrictor-valve 248*e*.

PRESSURE LIMITING IN FIGS. 2 – 5:

Referring now to FIGS. 2 – 5, each of the systems 10*b* – 10*e* includes a pilot relief valve 280*b* – 280*e*, respectively, which is connected between the respective ones of the second area conduits 150*b* – 150*e* and the sump 16*e*. Each of the pilot relief valves 280*b* – 280*e* is effective to limit the fluid pressure which is applied to the respective ones of the second fluid-responsive areas 162*b* – 162*e* and is therefore effective to limit both the force which urges the respective ones of the valve spools 32*b* – 32*e* toward their operating modes and the maximum pump pressure of the respective ones of the pumps 14*b* – 14*e*.

Referring now to the FIG. 5 configuration, the system 10*e* includes a pilot relief valve 282*e* which may optionally replace the pilot relief valve 280*e*. The pilot relief valve 282*e* is connected between the third area conduit 146*e* and a sump 16*j* and is effective to limit the fluid pressure which is applied to the third fluid-responsive area 180*e* and thereby to limit the maximum pump pressure in the same manner as the pilot relief valve 280*e*.

FLOW LIMITATION IN FIGS. 3 – 5:

Referring now to FIGS. 3 – 5, the systems 10*c* – 10*e* each include a flow valve 290*c* – 290*e* respectively. Each of the flow valves 290*c* – 290*e* are identical to each other; and each of the flow valves 290*c* – 290*e* is connected into the respective ones of the systems 10*c* – 10*e* in the same manner; so only the flow valve 290*d* of the FIG. 4 configuration will be described.

Referring now to FIG. 4, the flow valve 290*d* is interposed into the pump pressure conduit 120*d* and provides a flow path 292*d* which intercommunicates the pump 14*d* with the inlet ports 72*d* and 74*d* when the flow valve 290*d* is in a position 294*d* as shown. The flow valve 290*d* is actuated to the position 294*d* by a spring 296*d* and an operator 298*d*. The flow valve 290*d* is operated to a position 304*d* by an operator 302*d*.

The directional control valve 20*d'* includes a pair of inlet ports (not shown, same as 72*d* and 74*d*) that are connected to the pump pressure conduit 120*d*, intermediate of the pump 14*d* and the flow valve 290*d*, by a pump pressure conduit 120*d'*; so the flow valve 290*d* is effective to control fluid flow to the control valve 20*d* but is not effective to control fluid flow to the control valve 20*d'*.

In the operation of the system 10*d* of FIG. 4, whenever both of the valving elements 90*d* and 90*d'* are moved to their operating positions and whenever the directional control valve 20*d'* is applying fluid pressure to a second fluid-actuated device (not shown, same as 22*d*) at a higher load-actuating pressure than that which the directional control valve 20*d* is supplying to the fluid-actuted device 22*d*, then the bypass valve 18*d* is controlled by the higher load-actuating pressure of the second fluid-actuated device and the pump pressure in pump pressure conduit 120*d* is higher than that which is required by the directional control valve 20*d* and the fluid-actuated device 22*d*.

When this happens, the fluid-actuated device 22*d* would be operated with a higher fluid flow rate than that which had been selected by the position of the valving element 90*d*; because the pressure of the pump 14*d* is now greater than that which is required for the fluid-actuated device 22*d* and the load-actuating pressure thereof.

At this time, the flow valve 290*d*is actuated by the pump pressure at a point 300*d*, as applied to an operator 302*d*, to actuate the flow valve 290*d* toward a position 304*d* and to restrict fluid flow from the pump 14*d* to the inlet ports 72*d* and 74*d*. Also, at the same time, the load-actuating pressure of the fluid-actuated device 22*d* is supplied to the operator 298*d* by way of a conduit 306*d* which communicates with the first signal port 80*d*. The load-actuating pressure, as applied to the operator 298*d*, and the spring 296*d* cooperate with the pressure of the point 300*d* and the operator 302*d* to restrict fluid flow from the pump 14*d* to the inlet ports 72*d* and 74*d* and thereby to limit the fluid pressure which is applied to the inlet ports 72*d* and 74*d* to approximately the same value as if the second directional control valve 20*d'* were not supplying fluid pressure to the second fluid-actuated device (not shown) at a higher load-actuating pressure than that which the directional control valve 20*d* is supplying to the fluid-actuated device 22*d*.

SUMMARIZING REMARKS AND TRANSITION TO CLAIMS:

Referring finally to FIGS. 1 – 5, it has been shown that there is provided a bypass valve, 18*a* – 18*e*, in which a third fluid-responsive area, 180*a* – 180*e*, is provided which either assists or opposes a first fluid-responsive area, 160*a* – 160*e*. The third fluid-responsive area, 180*a* – 180*e*, is effective to cooperate with a third area signal means, 206*a* – 206*e*, to provide a system in which a fluid-responsive area, equal to the full projected-end area of a valve spool, 32*a* – 32*e*, is used to actuate the valve spool, 32*a* – 32*e*, to a bypassing position at a low pump pressure when a movable valving element, 90*a* – 90*e*, of a directional control valve, 20*a* – 20*e*, is in its standby position. Then, when the movable valving element, 90*a* – 90*e*, of the respective ones of the directional control valves, 20*a* – 20 *e*, is moved to an operating position, the third fluid-responsive area, 180*a* – 180*e*, and the third area signal means, 206*a* – 206*e*, cooperate to actuate the valve spool, 32*a* – 32*e*, to a bypassing mode and to bypass excess fluid from a pump, 14*a* – 14*e*, at a higher differential pressure between the pump pressure and the load-actuating pressure than the difference between the pump pressure and the sump pressure when the valving element, 90*a* – 90*e*, is in the standby position.

Each of the systems, 10*a* – 10*e*, includes three conduits in which discontinuities are shown. These discontinuities graphically illustrate the similarities in the interconnections of the systems, 10*a* – 10*e*; and those skilled in the art will readily see that other systems can be made by intermixing the portions of some of the systems that lie above the discontinuities with the portions of some of the systems that lie below the discontinuities.

While there have been described above the principles of this invention in connection with specific apparatus, it is to be clearly understood that this description is made only by way of example and not as a limitation to the scope of the invention. Any reference numerals or other materials within brackets in the claims as originally filed do not form part of the claims proper. Any such materials are provided only for purposes of exposition and not by way of limitation.

I claim:

1. A load-responsive hydraulic system of the type which includes a source of fluid having a pump that delivers pressurized fluid at the fluid pressure thereof and a sump that receives fluid at the fluid pressure thereof, a fluid-actuated device, a directional control valve having a body that is connected to said source to receive fluid therefrom at said pump pressure and to deliver fluid thereto at said sump pressure and having a movable valving element that is movable to a standby position wherein said fluid-actuated device is isolated from said pump and to an operating position wherein pressurized fluid is supplied from said pump to said device at the load-actuating pressure thereof, and a differential pressure actuated bypass valve having a housing that is connected to said source for bypassing of fluid from said pump to said sump and having a valve spool that includes both a first fluid-responsive area connected to said pump for actuating said valve spool to a bypassing mode by said pump pressure wherein said pump fluid is bypassed to said sump and a second fluid-responsive area for actuating said valve spool to an operating mode wherein said bypassing is occluded, the improvement which comprises:

a third fluid-responsive area in said bypass valve, being operably connected to said valve spool, and being effective to actuate said valve spool to one of said modes by a force that is proportional to the fluid pressure applied thereto and by a distance proportional to the movement thereof;

second area signal means, including a signal port in said control valve that is connected to said second fluid-responsive area and including said valving element, for establishing a fluid flow path in said control valve between said signal port and said fluid-actuated device to sense said load-actuating pressure thereby, for applying said load-actuating pressure and the changes thereof to said second area when said control valve is in said operating position, and for attenuating said load-actuating pressure that is applied to said second area when said control valve is in said standby position; and third area signal means, being connected to said third fluid-responsive area and to said source, and being responsive to said pump pressure, for applying said pump pressure to said third area, and for applying another of said pressures to said third area.

2. A system as claimed in claim 1 in which said other pressure comprises said load-actuating pressure.

3. A system as claimed in claim 1 in which said other pressure comprises said sump pressure.

4. A system as claimed in claim 1 in which said third area signal means, said connections thereof to said third fluid-responsive area and to said source, and said responsiveness to said pump pressure comprise: a third area signal valve being connected to said third area and to said pump.

5. A system as claimed in claim 1 in which said housing of said bypass valve includes a second area port communicating with said second fluid-responsive area and a third area port communicating with said third fluid-responsive area, and said third area signal means, said connections thereof to said third area and to said source, and said responsiveness thereof to said pump pressure comprises:

a third area supply restrictor-valve being connected to said third area and to said pump, and a third area signal valve having a first valved port connected to said third area, having a second valved port connected to said second area port, and having an operator connected to said pump.

6. A system as claimed in claim 1 in which said second area signal means includes a second area attenuation restrictor-valve interconnecting said second fluid-responsive area and said sump, and said attenuating of said load-actuating pressure that is applied to said second fluid-responsive area comprises said second area attenuation restrictor-valve.

7. A system as claimed in claim 1 in which said third area signal means includes a third area supply restrictor-valve being connected between said pump and said third area and supplying pressurized fluid from said pump to said third area.

8. A system as claimed in claim 1 in which said second area signal means includes a second area supply restrictor-valve being connected between said pump and said second area and supplying pressurized fluid from said pump to said second area.

9. A system as claimed in claim 1 in which said system includes a pilot relief valve being connected between said second area and said sump and providing pressure limitation for said second area.

10. A system as claimed in claim 1 in which said system includes a pilot relief valve being connected between said third area and said sump and providing pressure limitation for said third area.

11. A system as claimed in claim 1 in which said one mode comprises said bypassing mode.

12. A system as claimed in claim 1 in which said one mode comprises said operating mode.

13. A system as claimed in claim 1 in which said housing of said bypass valve includes a spool bore therein, and said valve spool is slidably fitted into said spool bore;

said housing includes a plunger bore of a smaller diameter than said spool bore, being positioned at one end of and opening into said spool bore, and being disposed with the longitudinal axis thereof parallel to the longitudinal axis of said spool bore;

said bypass valve includes a plunger being slidably fitted into said plunger bore and being adapted to cooperate with said valve spool in the actuation of said valve spool to said modes;

one of said areas comprises the projectedend area of said plunger that is distal from said valve spool; and another of said fluid-responsive areas comprises the net area between the outside diameter of said plunger and the outside diameter of said valve spool.

14. A system as claimed in claim 1 in which said valve spool includes a plunger bore extending into said valve spool from one end thereof, being in axial alignment to the longitudinal axis thereof, and being closed at the bottom end by a portion of said valve spool;

said bypass valve includes a plunger being slidably fitted into said plunger bore; and one of said fluid-responsive areas comprises said bottom end of said plunger bore.

15. A system as claimed in claim 1 in which said system is of the type which includes a second fluid-actuated device, a second directional control valve being connected to said source and to said second device and having both an operating position wherein pressurized fluid is supplied from said pump to said second device at the load-actuating pressure thereof and a standby position wherein said second device is isolated from said pump, the improvement which comprises:

said connections of said control valves to said source comprise a pump pressure conduit connecting both of said control valves to said pump; and a flow valve being interposed into said pump pressure conduit between said pump and the first said directional control valve, having a first operator connected to said first signal port of said first directional control valve, and having a second operator connected to said pump pressure conduit intermediate of said flow valve and said first directional control valve.

16. A system as claimed in claim 1 in which said body of said directional control valve includes an element bore slidably receiving said movable valving element, a work port intercepting said element bore and being connected to said device to provide said connection of said control valve to said device, and a load signal passage being connected to said signal port and intercepting said element bore;

said connection of said first signal port to said second area comprises a second area conduit;

said second area signal means comprises a second area attenuation restrictor-valve interconnecting said signal port and said sump, and said load signal passage;

said third area signal means comprises a third area supply restrictor-valve, a third area signal valve, and said second area attenuation restrictor-valve; and said third area signal valve includes a first valved port being connected to said third area to provide said connection of said third area signal means to said third area and being connected to said pump by said third area supply restrictor-valve to provide said connection of said third area signal means to said source, a second valved port being connected to said second area conduit, and a signal valve operator being connected to said pump to provide said responsiveness to pump pressure.

17. A load-responsive hydraulic system of the type hich includes a source of fluid having a pump that elivers pressurized fluid at the fluid pressure thereof id a sump that receives fluid at the fluid pressure ereof, a fluid-actuated device, a directional control alve having a body that is connected to said source to ceive fluid therefrom at said pump pressure and to eliver fluid thereto at said sump pressure and having a ovable valving element that is movable to a standby osition wherein said fluid-actuated device is isolated om said pump and to an operating position wherein ressurized fluid is supplied from said pump to said evice at the load-actuating pressure thereof, and a ifferential pressure actuated bypass valve having a ousing that is connected to said source for bypassing f fluid from said pump to said sump and having a valve ool that includes both a first fluid-responsive area onnected to said pump for actuating said valve spool a bypassing mode by said pump pressure wherein id pump fluid is bypassed to said sump and a second uid-responsive area for actuating said valve spool to n operating mode wherein said bypassing is occluded, e improvement which comprises:

a third fluid-responsive area in said bypass valve, being operably connected to said valve spool, and being effective to actuate said valve spool to one of said modes by a force that is proportional to the fluid pressure applied thereto and by a distance proportional to the movement thereof;

second area signal means, including a first signal port in said control valve that is connected to said second fluid-responsive area and including said valving element, for establishing a first fluid flow path in said control valve between said first signal port and said fluid-actuated device to sense said load-actuating pressure thereby, for applying said load-actuating pressure and the changes thereof to said second area when said control valve is in said operating position, and for attenuating said load-actuating pressure that is applied to said second area when said control valve is in said standby position; and third area signal means, including a second signal port in said control valve and including said valving element, being connected to said third fluid-responsive area and to said sources, and being responsive to said pump pressure, for establishing a second fluid flow path from said second signal port to said source, for applying said pump pressure to said third area when said control valve is in one of said positions, and for applying another of said pressures to said third area when said control valve is in the other of said positions.

18. A system as claimed in claim 17 in which said stablishing of said second fluid flow path to said ource comprises establishing said second fluid flow ath to said sump.

19. A system as claimed in claim 17 in which said stablishing of said second fluid flow path to said ource comprises establishing said second fluid flow ath to said pump, 20. A system as claimed in claim 17 in which said perating position is the one of said positions wherein aid pump pressure is applied to said third area.

21. A system as claimed in claim 17 in which said tandby position is the one of said positions wherein aid pump pressure is applied to said third area.

22. A system as claimed in claim 17 in which said system is of the type which includes a second fluid-actuated device, a second directional control valve being connected to said source and to said second device and having a second movable valving element that includes both an operating position wherein pressurized fluid is supplied from said pump to said second device at the load-actuating pressure thereof and a standby position wherein said device is isolated from said pump, the improvement which comprises:

said second control valve includes another second signal port and another second fluid flow path being established in said second control valve from said other second signal port to said source when said second control valve is in one of said positions; and said third area signal means includes second fluid flow path connection-means for connecting both of said seconnd signal ports to said third area, for establishing fluid communication from said third area to said source via one of said second fluid flow paths when either one of said control valves is in said standby position and the other of said control valves is in a first one of said positions, and for occluding said fluid communication from said third area to said source when either one of said control valves is in said standby position and the other of said control valves is in a second one of said positions.

23. A system as claimed in claim 22 in which said second fluid flow path connection-means comprises series connection of first said second fluid flow path and said other second fluid flow path.

24. A system as claimed in claim 22 in which said second fluid flow path connection-means comprises parallel connection of first said second fluid flow path and said other second fluid flow path.

25. A system as claimed in claim 17 in which said system is of the type which includes a second fluid-actuated device, a second directional control valve being connected to said source and to said second device and having both an operating position wherein pressurized fluid is supplied from said pump to said second device at the load-actuating pressure thereof and a standby position wherein said device is isolated from said pump, the improvement which comprises:

said second area signal means includes another first signal port in said second control valve and another first fluid flow path being established between said other first signal port and said second device when said second control valve is in said operating position; and said second area signal means further includes logic means, being interposed between first said first signal port and said second area and connecting said other first signal port to said second area, for pressurizing said second area by the load-actuating pressure of the one of said devices receiving the highest load-actuating pressure when both of said control valves are actuated to said operating positions.

26. A system as claimed in claim 25 in which said logic means establishes a flow path from said one fluid-actuated device to said second area.

27. A system as claimed in claim 25 in which said logic means establishes a fluid flow path from said second area to said one fluid-actuated device.

28. A system as claimed in claim 25 in which said logic means for pressurizing said second area by said highest load-actuating pressure comprises:

means for reducing said pressurization of said second area to the pressure level of a new highest load-actuating pressure when first said highest load-actuating pressure is reduced.

29. A system as claimed in claim 28 in which said reducing means comprises a second area attenuation restrictor-valve interconnecting said second area and said sump.

30. A system as claimed in claim 28 in which said logic means comprises means for returning excess load-actuating pressure from said second area to said device; and said reducing means comprises said returning means.

31. A system as claimed in claim 17 in which said housing of said bypass valve includes a third area port communicating with said third fluid-responsive area;

said third area signal means comprises a third area signal valve having a first valved port connected to said third area port, having a second valved port connected to said pump, and having a signal valve operator connected to said second signal port;

said connection of said third area signal means to said third fluid-responsive area comprises said connection of said first valved port to said third area port, said connection of said third area signal means to said source comprises said connection of said second valved port to said pump, and said responsiveness to said pump pressure comprises said signal valve operator and said connection of said signal valve operator to said pump; and said establishing of said second fluid path from said second signal port to said source comprises establishing said second fluid path from said second signal port to said sump when said control valve is in said standby position.

32. A system as claimed in claim 17 in which said second area signal means includes said second fluid flow path and a one-way flow valve interconnecting said second fluid-responsive area and said second signal port and permitting fluid flow from said second fluid-responsive area to said second signal port, whereby said attenuating of said load-actuating pressure applied to said second area includes said second fluid flow path.

33. A load-responsive hydraulic system of the type which includes a source of fluid having a pump that delivers pressurized fluid at the fluid pressure thereof and a sump that receives fluid at the fluid pressure thereof, a fluid-actuated device, a directional control valve having a body that is connected to said source to receive fluid therefrom at said pump pressure and to deliver fluid thereto at said sump pressure and having a movable valving element that is movable to a standby position wherein said fluid-actuated device is isolated from said pump and to an operating position wherein pressurized fluid is supplied from said pump to said device at the load-actuating pressure thereof, and a differential pressure actuated bypass valve having a housing that is connected to said source for bypassing of fluid from said pump to said sump and having a valve spool that includes both a first fluid-responsive area connected to said pump for actuating said valve spool to a bypassing mode by said pump pressure wherein said pump fluid is bypassed to said sump and a second fluid-responsive area for actuating said valve spool to an operating mode wherein said bypassing is occluded, the improvement which comprises:

a third fluid-responsive area in said bypass valve, being operably connected to said valve spool, and being effective to actuate said valve spool to one of said modes by a force that is proportional to the fluid pressure applied thereto and by a distance proportional to the movement thereof;

second area signal means, including a first signal port in said control valve that is connected to said second fluid-responsive area and including said valving element, for establishing a first fluid flow path in said control valve between said first signal port and said fluid-actuated device to sense said load-actuating pressure thereby, for applying said load-actuating pressure and the changes thereof to said second area when said control valve is in said operating position, and for attenuating said load-actuating pressure that is applied to said second area when said control valve is in said standby position; and third area signal means, including a second signal port in said control valve and including said valving element, being connected to said third fluid-responsive area and to said source, and being responsive to said pump pressure, for establishing a second fluid flow path from said second signal port to said source, for applying said pump pressure to said third area when said control valve is in one of said positions, and for applying said load-actuating pressure to said third area when said control valve is in the other of said positions.

34. A system as claimed in claim 33 in which said body of said directional control valve includes an element bore slidably receiving said movable valving element, a work port intercepting said element bore and being connected to said device to provide said connection of said control valve to said device, a load signal passage being connected to said first signal port and intercepting said element bore, an attenuation signal passage being connected to said second signal port and intercepting said element bore, and an attenuation return passage being connected to said sump and intercepting said element bore;

said valving element includes means for communicating said load signal passage with said work port when said valving element is in said operating position and for communicating said attenuation signal passage with said sump when said valving element is in said standby position;

said connection of said first signal port to said second area comprises a second area conduit;

said first fluid flow path of said second area signal means comprises said load signal passage;

said second area signal means further comprises said attenuation signal passage, said attenuation return passage, and a one-way flow valve interconnecting said second area conduit and said second signal port and providing one-way fluid communication from said second area conduit to said second signal port;

said second fluid flow path of said third area signal means comprises said attenuation signal passage and said attenuation return passage;

said third area signal means further comprises a third area signal valve, a pressure change restrictor-valve, and an operator supply restrictor-valve;

said third area signal valve includes a first valved port being connected to said third area to provide said connection of said third area signal means to said third area, a second valved port being connected to said pump to provide said connection of said third area signal means to said source, and a signal valve operator being connected to said pump by said operator supply restrictor-valve to provide said responsiveness to said pump pressure and being connected to said second signal port; and said pressure change restrictor-valve is connected between said third area and said second area.

35. A load-responsive hydraulic system of the type which includes a source of fluid having a pump that delivers pressurized fluid at the fluid pressure thereof and a sump that receives fluid at the fluid pressure thereof, a fluid-actuated device, a directional control valve having a body that is connected to said source to receive fluid therefrom at said pump pressure and to deliver fluid thereto at said sump pressure and having a movable valving element that is movable to a standby position wherein said fluid-actuated device is isolated from said pump and to an operating position wherein pressurized fluid is supplied from said pump to said device at the load-actuating pressure thereof, and a differential pressure actuated bypass valve having a housing that is connected to said source for bypassing of fluid from said pump to said sump and having a valve spool that includes both a first fluid-responsive area connected to said pump for actuating said valve spool to a bypassing mode by said pump pressure wherein said pump fluid is bypassed to said sump and a second fluid-responsive area for actuating said valve spool to an operating mode wherein said bypassing is occluded, the improvement which comprises:

a third fluid-responsive area in said bypass valve, being operably connected to said valve spool, and being effective to actuate said valve spool to one of said modes by a force that is proportional to the fluid pressure applied thereto and by a distance proportional to the movement thereof;

second area signal means, including a first signal port in said control valve that is connected to said second fluidresponsive area and including said valving element, for establishing a first fluid flow path in said control valve between said first signal port and said fluid-actuated device to sense said load-actuating pressure thereby, for applying said load-actuating pressure and the changes thereof to said second area when said control valve is in said operating position, and for attenuating said load-actuating pressure that is applied to said second area when said control valve is in said standby position; and third area signal means, including a second signal port in said control valve and including said valving element, being connected to said third fluid-responsive area and to said source, and being responsive to said pump pressure, for establishing a second fluid flow path from said second signal port to said source, for applying said pump pressure to said third area when said control valve is in one of said positions, and for applying said sump pressure to said third area when said control valve is in the other of said positions.

36. A system as claimed in claim 35 in which said one position comprises said standby position.

37. A system as claimed in claim 36 in which said body of said directional control valve includes an element bore slidably receiving said movable valving element, a work port intercepting said element bore and being connected to said device to provide said connection of said control valve to said device, a load signal passage being connected to said first signal port and intercepting said element bore, an attenuation signal passage being connected to said second signal port and intercepting said element bore, and an attenuation return passage being connected to said sump and intercepting said element bore;

said valving element includes means for communicating said load signal passage with said work port when said valving element is in said operating position and for communicating said attenuation signal passage with said sump when said valving element is in said standby position;

said connection of said first signal port to said second area comprises a second area conduit;

said first fluid flow path of said second area signal means comprises said load signal passage;

said second area signal means further comprises a second area attenuation restrictor-valve interconnecting said second area conduit and said sump;

said second fluid flow path of said third area signal means comprises said attenuation signal passage and said attenuation return passage;

said third area signal means further comprises a third area signal valve, a third area attenaution restrictor-valve, and an operator supply restrictor-valve;

said third area signal valve includes a first valved port being connected to said third area to provide said connection of said third area signal means to said third area, a second valved port being connected to said pump to provide said connection of said third area signal means to said source, and a signal valve operator being connected to said pump by said operator supply restrictor-valve to provide said responsiveness to said pump pressure and being connected to said second signal port; and said third area attenuation restrictor-valve is connected between said third area and said sump.

38. A system as claimed in claim 35 in which said one position comprises said operating position.

39. A system as claimed in claim 38 in which said body of said directional control valve includes an element bore slidably receiving said movable valving element, a work port intercepting said element bore and being connected to said device to provide said connection of said control valve to said device, a load signal passage being connected to said first signal port and intercepting said element bore, an attenuation signal passage being connected to said second signal port and intercepting said element bore, and an attenuation return passage being connected to said sump and intercepting said element bore;

said valving element includes means for communicating said load signal passage with said work port when said valving element is in said operating position and for communicating said attenuation signal passage with said sump when said valving element is in said standby position;

said connection of said first signal port to said second area comprises a second area conduit;

said first fluid flow path of said second area signal means comprises said load signal passage;

said second area signal means further comprises a one-way flow valve interconnecting said second area conduit and said second signal port and allowing fluid flow from said second area conduit to said second signal port, said attenuation signal passage, and said attenuation return passage;

said second fluid flow path of said third area signal means comprises said attenuation signal passage and said attenuation return passage; and said third area signal means further comprises a third area supply restrictor-valve being connected to said third area to provide said connection of said third area signal means to said third area, being connected to said pump to provide said connection of said third area signal means to said source and to provide said responsiveness of said pump pressure, and being connected to said second signal port.

40. A system as claimed in claim 39 in which said system is of the type which includes a second fluid-actuated device, a second directional control valve being connected to said source and to said second device and having a second movable valving element that includes both an operating position wherein pressurized fluid is supplied from said pump to said second device at the load-actuating pressure thereof and a standby position wherein said device is isolated from said pump, the improvement which comprises:

said second control valve includes another second signal port and another second fluid flow path being established in said second control valve from said other second signal port to said source when said second control valve is in one of said positions; and both of said second fluid flow paths are established when said movable valving element are in said standby positions, and said second fluid flow paths are connected in series between first said second signal port and said sump.

41. A system as claimed in claim 39 in which said system is of the type which includes a second fluid-actuated device, a second directional control valve being connected to said source and to said second device and having a second movable valving element that includes both an operating position wherein pressurized fluid is supplied from said pump to said second device at the load-actuating pressure thereof and a standby position wherein said device is isolated from said pump, the improvement which comprises:

said second control valve includes another first signal port;

said second area signal means comprises another first fluid flow path being established between said other first signal port and said second device when said second valving element is in said operating position; and said second area signal means comprises logic means, interconnecting first said first signal port and said second area to provide said connection of said second area signal means and said second area and being connected to said other first signal port, for selecting the highest load-actuating pressure that is supplied to either of said devices when both of said valving elements are moved to said operating positions, for pressurizing said second area by the pressure magnitude of said highest load-actuating pressure, and for reducing said pressurizing of said second area when said highest load-actuating pressure is reduced.

42. A system as claimed in claim 35 in which said establishing of said second fluid flow path to said sourc comprises establishing said second fluid flow path to said pump.

43. A system as claimed in claim 42 in which said body, of said directional control valve includes an element bore slidably receiving said movable valving element, a work port intercepting said element bore and being connected to said device to provide said connection of said control valve to said device, a load signal passage being connected to said first signal port and intercepting said element bore, an inlet port intercepting said element bore and being connected to said pump to provide said connection of said control valve to said source, a pressure signal passage intercepting said element bore and being connected to said second signal port;

said valving element includes means for communicating said load signal passage with said work port and for communicating said pressure signal passage with said inlet passage when said valving element is in said operating position;

said connection of said first signal port to said second area comprises a second area conduit;

said first fluid flow path of said second area signal means comprises said load signal passage;

said second area signal means further comprises a second area attenuation restrictor-valve being connected to said second area conduit and to said sump;

said connection of said third area signal means to said third area comprises a third area conduit interconnecting said second signal port and said third area;

said second fluid flow path of said third area signal means comprises said pressure signal passage; and said third area signal means further comprises a third area attenuation restrictor-valve interconnecting said third area conduit and said sump.

* * * * *